United States Patent
Burley

[11] 3,893,430
[45] July 8, 1975

[54] COMBINATION SPARK PLUG AND PRECOMBUSTION CHAMBER FOR ROTARY ENGINE

[75] Inventor: Harvey A. Burley, Warren, Mich.
[73] Assignee: General Motors Corporation, Detroit, Mich.
[22] Filed: Nov. 30, 1973
[21] Appl. No.: 420,548

[52] U.S. Cl............................. 123/8.13; 123/8.09
[51] Int. Cl............................................. F02b 53/04
[58] Field of Search.................. 123/8.09, 8.13, 8.45

[56] References Cited
UNITED STATES PATENTS

| | | | |
|---|---|---|---|
| 3,508,530 | 4/1970 | Clawson........................ | 123/8.09 X |
| 3,762,377 | 10/1973 | Anthony et al................ | 123/8.09 X |
| 3,766,893 | 10/1973 | Tredway et al................ | 123/8.09 X |

FOREIGN PATENTS OR APPLICATIONS

| | | | |
|---|---|---|---|
| 993,769 | 6/1965 | United Kingdom................ | 123/8.13 |
| 1,301,614 | 8/1969 | Germany.......................... | 123/8.09 |
| 1,426,038 | 4/1969 | Germany.......................... | 123/8.09 |

Primary Examiner—C. J. Husar
Assistant Examiner—Leonard Smith
Attorney, Agent, or Firm—Charles R. Engle

[57] ABSTRACT

A stratified charge rotary internal combustion engine rotor having precombustion chamber cavities positioned in a wall thereof receiving a relatively rich air-fuel mixture for subsequent ignition and expansion through a throat passage to ignite a main combustion charge on a rotor peripheral surface. A relatively small spark plug and precombustion chamber assembly is mounted in each precombustion cavity wherein the spark plug is electrically connected in an ignition circuit while the liner containing the plug precisely defines the volume of a precombustion chamber. The assembly is retained in the cavity by a threaded sleeve engaging a tapped portion of the cavity.

4 Claims, 5 Drawing Figures

COMBINATION SPARK PLUG AND PRECOMBUSTION CHAMBER FOR ROTARY ENGINE

This invention relates to a stratified charge rotary internal combustion engine and more specifically to a rotary engine rotor having precombustion cavities receiving a liner and spark plug assembly defining precombustion chambers of a specific volume in a rotor face for rotational periodic communication with an auxiliary carburetor supplying a rich air-fuel mixture to the precombustion chambers.

Stratified charge engines have demonstrated an ability to operate with lower nitrous oxide emissions. A common method of obtaining a stratified charge in a reciprocating engine is to use two connected combustion chambers, each having their own fuel induction system. The smaller of the two connected combustion chambers, which is a precombustion chamber, receives a relatively rich mixture, which can be as rich as a two to one air-fuel ratio and usually has a volume of three to twenty percent of the volume of the main combustion chamber. In the larger main combustion chamber, the air-fuel mixture ratio is usually in the range of twenty to one. During the compression stroke of the engine, fuel in the precombustion chamber is diluted somewhat as the lean mixture in the main combustion chamber is forced into the smaller chamber through a throat connecting passage. This reduces the rich mixture in the precombustion chamber, supplied by an auxiliary carburetor, to a more combustible mixture so that ignition occurs in the smaller chamber and the burning gases expand into the main combustion chamber igniting the lean mixture therein, this concept sometimes being referred to as torch ignition. The net effect of a stratified charge engine is that the fuel burns at a lower temperature for a longer time period so as to reduce the formation of nitrous oxides.

Application of these known concepts to a rotary combustion engine is not an easy matter because of the minimal space available in the engine housing structure and the usual rotor configuration. By virtue of the rotors being required to rotate within a closed cavity defined by the engine housing, the structure of the rotary engine does not lend itself to providing a precombustion chamber or a second smaller combustion chamber in the peripheral wall of the engine. This is particularly due to the fact that sufficient cooling of the engine requires the entire peripheral area of the cavity to be in contact with a circulated coolant in the combustion areas of the engine. The placement of a smaller precombustion chamber in this area seriously interferes with the flow of coolant in this critical area. A further problem resulting from the provision of a precombustion chamber in the engine housing results from the scrubbing or rubbing engagement of the peripheral rotor seals with the edge of a throat passage required to connect the precombustion chamber with the main combustion chamber. Likewise, the placement of a spark plug in the engine casing in a location required to ignite the compressed main charge at a desirable time during rotor rotation interferes with the coolant area available adjacent the hotter portions of the engine. Rotary internal combustion engines present another problem when it is desired to supply the precombustion chamber with a carbureted charge. The precombustion chamber must be connected to the main chamber near the top dead center position of the rotor so that the burning gases in the prechamber can flow through the throat passage igniting the charge in the main combustion chamber. If the prechamber is positioned in the engine housing it always is in communication with the compressed gases preventing use of a carburetor to supply the rich mixture as it would have to be pressure injected. This problem is overcome by placing the rich inlet port in a constant vacuum area in the engine cycle and by placing the precombustion chambers between the gas and oil seals in the rotor face thereby avoiding positive pressures in opposition to the vacuum necessary for receipt of the carbureted charge.

Accordingly, it is a primary purpose of this invention to provide a precombustion chamber in a rotor face, preferably a side wall of the rotor, so that the precombustion chamber periodically and sequentially connects with an inlet port in a constant vacuum area in the side wall and receives a rich air-fuel mixture from an auxiliary carburetor. In the case of a triangular shaped rotor planetating within a trochoidal chamber, it is desirable to locate the precombustion chambers in one rotor side wall adjacent each apex of the triangularly shaped rotor. The precombustion chambers necessarily must be between conventional gas and oil seal assemblies in the rotor side wall to avoid a positive pressure preventing receipt of a carbureted charge. This permits locating a maximum sized rich mixture induction port in the housing end wall where it is not engaged by the rotor mounted gas and oil seal assemblies. Of course, the precombustion cavities can also be formed in the peripheral surfaces of the rotor defining the main combustion chamber and likewise avoid seal wear. By the provision of a liner containing a spark plug, the structure of this invention provides a precombustion chamber having a predetermined volume and eliminates the necessity of mounting a spark plug in a crucial area in the engine housing. Also the mounting of the spark plug within the liner eliminates the necessity of a sparking port in the engine housing thereby reducing the possibility of gas losses and increased seal wear as they engage the edges of the sparking port. The spark plug is formed to have an electrical contact on its bottom surface which connects with the sparking electrodes on the top of the spark plug within the precombustion chamber and engages a fixed electrical contact in the bottom of the precombustion cavity in the rotor providing an electrical connection to the plug through commutator segments on the inner periphery of the rotor and on the exterior surface of the engine crankshaft.

The precise location of the precombustion chambers adjacent the rotor apexes in a triangularly shaped rotor, as aforementioned, allows use of a maximum sized precombustion chamber and eliminates undesirable apex seal wear that would be incurred if the precombustion chamber is located in the engine housing such that the rotor seals would rub across the throat passage. Also by positioning the precombustion chambers in the rotor side face, communication of the relatively rich air-fuel mixture from the auxiliary carburetor is enhanced. It is significant that the rich mixture inlet port is always subjected to a vacuum so that a carburetor can be used to supply the rich mixture. It is only necessary to provide a passage through the hollow water cooled section of the engine end wall directing the rich air-fuel mixture to a substantially triangularly shaped inlet passage positioned for full opening to the precombustion chambers at a precise time during rotor rotation.

The main combustion chamber receives a lean air-fuel mixture from a main carburetor through an inlet port precisely positioned in the engine housing. Rotation of the rotor past the aforementioned side inlet port connecting with the auxiliary carburetor results in the precombustion chamber being filled with a rich air-fuel mixture at a specified time during rotor rotation. After the precombustion chamber has been filled with the rich mixture, further rotation of the rotor forces a portion of the lean main mixture through the throat passage and slightly dilutes the rich mixture. This places the rich mixture in a more combustible form so that the subsequent ignition of the rich mixture via the internally mounted spark plug results in the burning gases expanding through the throat passage into the main combustion chamber igniting the lean mixture therein.

Accordingly, a first object of the present invention is the provision of a new and improved precombustion chamber defined by a liner and spark plug assembly mounted in a rotor cavity cooperating in a sequential timed relationship with an inlet passage and an ignition circuit providing a stratified charge in a rotary engine.

Another object of the present invention is the provision of a stratified charge rotary engine having precombustion chambers formed in a rotor surface receiving a liner and spark plug assembly, the liner defining the volume of the precombustion chamber which cooperates with an inlet passage in an engine housing end wall supplied with a rich air-fuel mixture from an auxiliary carburetor.

A further object of the present invention is the provision of a stratified charge rotary engine having precombustion cavities specifically positioned in a triangularly shaped rotor side face near each apex in a constant vacuum area of the engine cycle, the cavities receiving a liner and spark plug assembly defining a precombustion chamber and sequentially and periodically communicating with an inlet port in an engine housing end wall which is always subjected to a vacuum supplying a carbureted rich air-fuel mixture to the precombustion chamber for ignition at a predetermined time when a lean air-fuel mixture is compressed in a main combustion chamber on a rotor peripheral surface.

A still further object of the present invention is the provision of a stratified charge rotary engine having precombustion chambers located adjacent each apex of a triangularly shaped rotor, the precombustion chambers being defined by a liner having a spark plug secured therein, a small passage being provided in the peripheral surface of the liner which communicates with a like passage in the rotor extending to the opposite side face thereof and connecting with a recessed balancing area in the opposite side face so that combustion pressures generated in the precombustion chamber are transmitted through the small passages to the opposite side of the rotor.

Another object of the present invention is the provision of a stratified charge rotary engine including a main combustion chamber and a relatively small precombustion chamber positioned in a peripheral surface of a triangularly shaped rotor, a throat passage connecting the precombustion chamber with the main combustion chamber, an axially extending passage extending from one rotor side face to the precombustion chamber, a removable sleeve liner containing a spark plug defining the precombustion chamber, an inlet port in a housing end wall periodically connecting with the axially extending passage in the rotor supplying a rich air-fuel mixture to the precombustion chamber within the liner, and a threaded gland nut containing the aforementioned throat passage threadably received in the terminal portion of the precombustion cavity retaining the liner and spark plug assembly therein so that ignition of the rich mixture within the precombustion chamber results in the burning gases expanding through the throat passage igniting the lean mixture in the main combustion chamber.

The novel features which I believe to be characteristic of my invention are set forth with particularity in the appended claims. My invention itself, however, both as to its organization and method of operation, may be best understood by referring to the following description taken in connection with the accompanying drawings in which:

Figure 1:
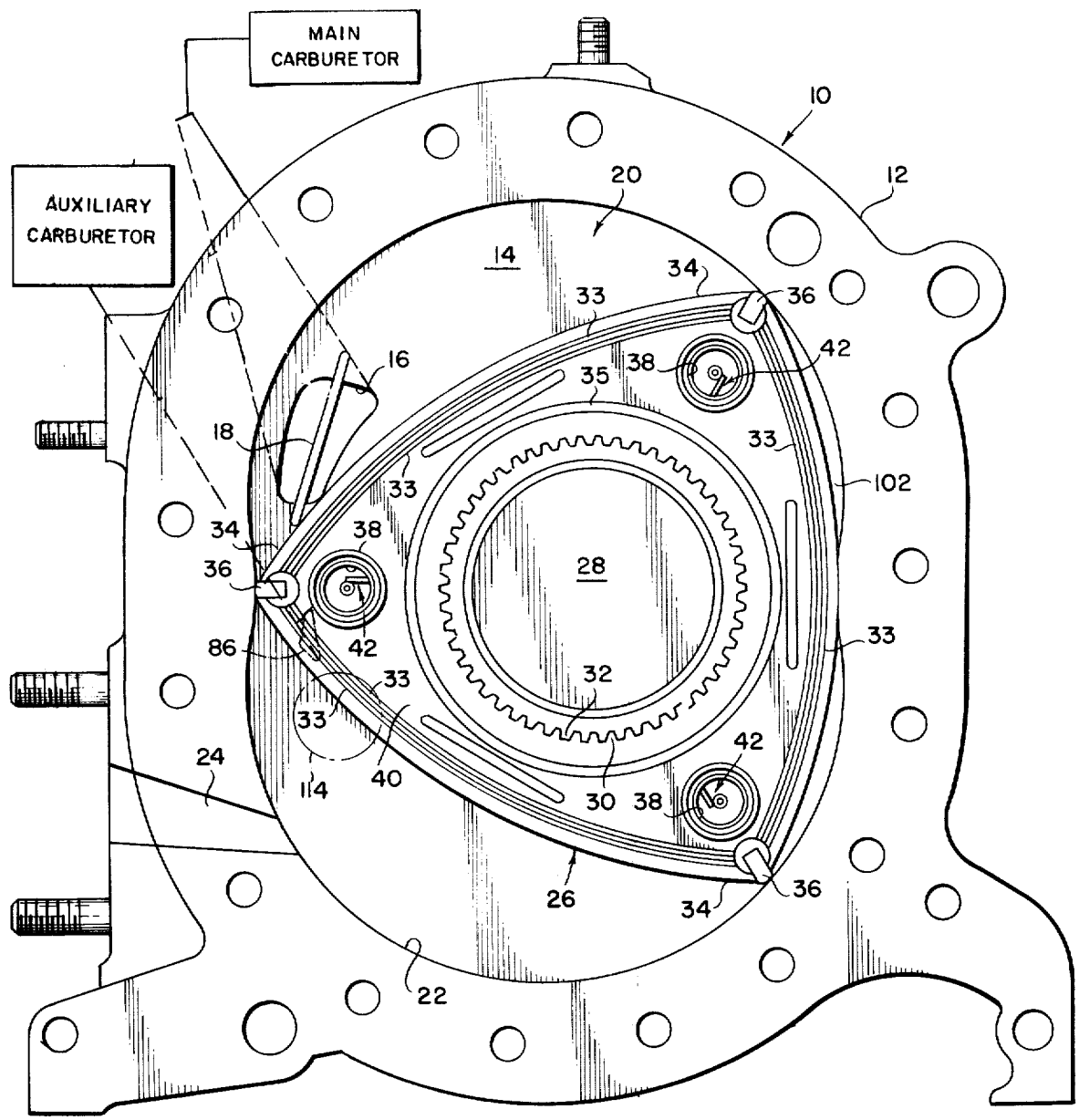
FIG. 1 is a side plan view illustrating a rotary internal combustion engine rotor having precombustion chambers formed therein in accordance with my invention, the precombustion chambers being defined by a liner and spark plug assembly and the rotor being shown disposed within a central engine housing member.

With reference now to FIG. 1, a rotary engine housing 10 is shown including a central housing section 12 enclosed on the back side by a rear housing member 14. The rear housing member 14 includes a main inlet port 16 having a seal bar 18 extending thereacross for a purpose later to be described. The central housing section 12 contains a two lobed trochoidal chamber 20 defined by an internal peripheral surface 22 which receives a triangularly shaped rotor, the trochoidal chamber and rotor being described as a preferred environment for the concept of my invention, primarily for purposes of illustration without any intent to limit application thereof. An exhaust passage 24 connects the chamber 20 with the exterior of the engine housing 10.

Figure 2:
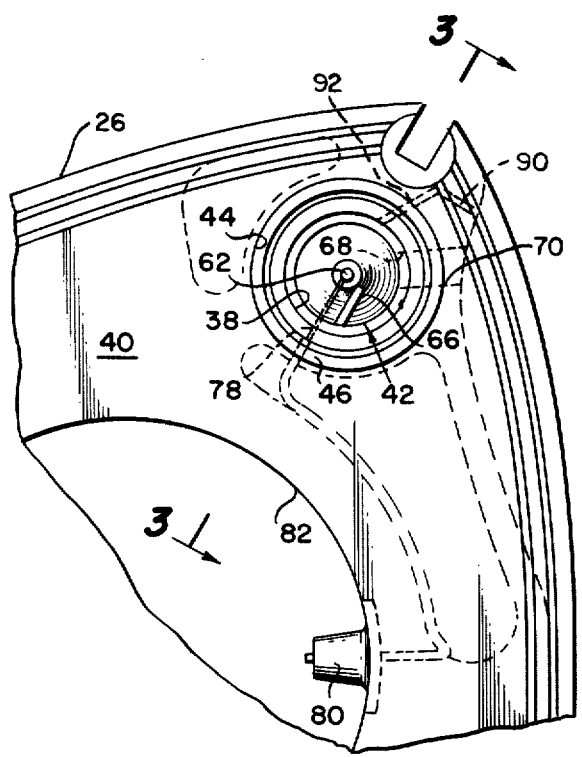
FIG. 2 is an enlarged fragmentary portion of a rotor more specifically illustrating the liner and spark plug assembly defining a precombustion chamber in accordance with my invention.

The trochoidal chamber 20 receives a rotor 26 rotatably mounted upon a crankshaft 28 which planetates relative to the crankshaft by virtue of the engagement of rotor phasing gear 30 with a fixed phasing gear 32 secured to the engine housing 10. As illustrated, the rotor 26 is triangularly shaped and includes apexes 34 containing seals 36 continuously engaging peripheral surface 22 of the trochoidal chamber 20. The rotor also contains gas seals 33 and an oil seal 35 preventing positive pressure fluids from entering the rotor area therebetween. A precombustion chamber cavity 38 is formed in the rotor 26 adjacent each apex 34 opening toward a front engine housing, not shown, and is located in side wall 40 of the rotor 26. The precombustion cavities 38 each receive a sleeve liner and spark plug assembly 42 as is more readily seen in FIG. 2. The rotor side wall 40 contains a circumferential groove 44 receiving an annular seal 46 as is also shown in FIG. 2.

Figure 3:
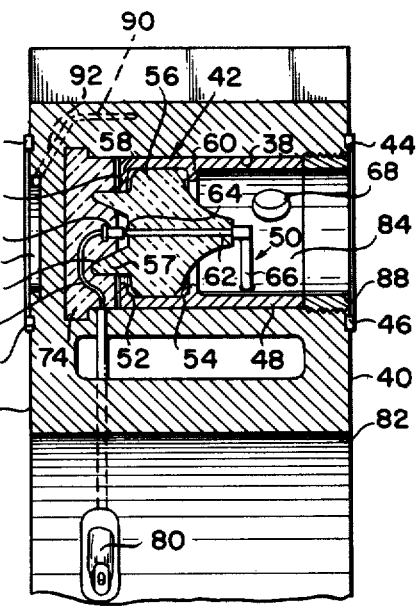
FIG. 3 is a fragmentary sectional view taken on line 3—3 of FIG. 2.

Referring now to FIG. 3, the sleeve liner and spark plug assembly 42 includes a cylindrical sleeve liner 48 having a relatively small spark plug assembly 50 secured therein. The spark plug 50 engages two peripheral sealing washers or rings 52 and 54 which are crimped in place against a ceramic insulating body 56 as the annular flanges 58 and 60 of the sleeve 48 are deformed. The tight engagement of the sealing rings 52 and 54 against the ceramic body 56 provides a fluid tight seal around the spark plug 50. The ceramic body 56 includes an axially extending tapered annular flange 57. The spark plug 50 includes a centrally extending electrode 62 which terminates in a contact 64 at the bottom of the ceramic insulating body 56 and extends upwardly into spaced association with a ground electrode 66 secured in the cylindrical sleeve 48. An aperture 68 in the wall of cylindrical sleeve 48 connects with a throat passage 70 formed in the rotor 26 which is best shown in FIG. 2.

The precombustion cavity 38 has a bottom wall 72 defined by an insulator member 74 molded in the rotor 26. The insulator 74 contains a tapered annular groove 75 receiving flange 57 having a tendency to force the insulating material toward electrical contact 64. The insulator body member 74 contains a fixed electrical contact 76 extending slightly outwardly from wall 72 for engagement with the central electrode 62 and its associated contact 64. The contact 76 is connected to a conductor wire 78 which extends inwardly of the rotor 26 and connects with a commutator segment 80 secured to inner peripheral surface 82 of the rotor 26. The commutator segment 80 engages a like segment secured to the outer surface of the crankshaft and provides electrical connection therebetween, the commutator segment on the crankshaft not being shown.

Still referring to FIG. 3, the sleeve liner and spark plug assembly 42 form a precombustion chamber 84 having a predetermined volume which receives a rich air-fuel mixture through opening 86, outlined in phantom in FIG. 1, in a front engine housing end wall, not shown. The inlet opening 86 in the front housing wall in preferred form is triangular in shape to provide a maximum area between rotor mounted gas and oil seals. The liner and spark plug assembly 42 is retained in the precombustion cavity by a gland nut 88 or a sleeve member having external threads thereon as shown in FIG. 3. As shown in FIG. 2, a small passage 90 opens to the main combustion cavity and connects with a passage 92 in rotor 26 which in turn connects with a balancing cavity 94 in the opposite side wall 96 of the rotor 26. The balancing cavity 94 is surrounded by an annular groove 44 receiving a seal 46 so that it is sealed in the same manner as the precombustion chambers 84. The seal bar 18 extending across main inlet port 16 retains the seals 46 in place during rotor rotation.

Figure 4:
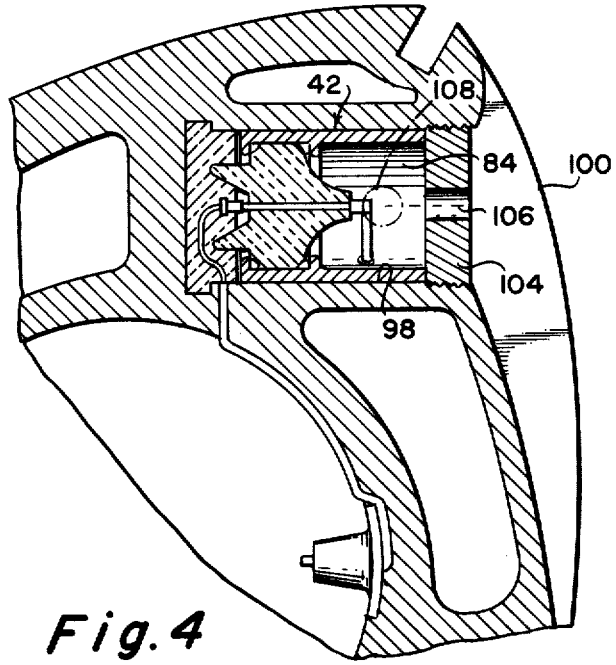
FIG. 4 is an enlarged fragmentary sectional view of a rotor including a modified form of my invention.
Figure 5:
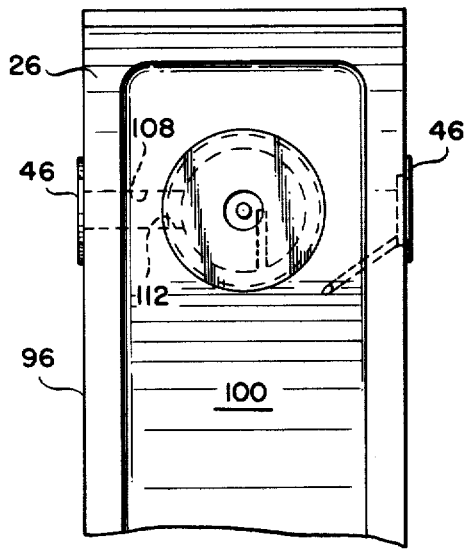
FIG. 5 is a fragmentary end plan view of FIG. 4 taken on line 5—5.

A modified form of my invention is shown in FIG. 4 wherein rotor 26 contains precombustion cavities 98 formed so that they open on rotor peripheral surface 100, which in conjunction with the rotor housing defines a main combustion chamber 102 as illustrated in FIG. 1. The sleeve liner and spark plug assembly 42 are received within the precombustion cavities 98 and are retained therein by a gland nut 104 containing an aperture 106 having a predetermined diameter so as to define a throat passage between the precombustion chamber 84 and the main combustion chamber 102. As illustrated in FIG. 5, this arrangement utilizes an axially extending passage 108, shown in phantom, which connects the precombustion chambers 84 with side wall 96 of rotor 26 whereby the passage 108 opens to the side inlet port 86 in the front housing end wall. The side mounted inlet port 86 is shown in phantom of FIG. 1 for purposes of illustration. It is located in a low pressure area of the engine so that vacuum is available allowing a supply of a carbureted mixture. The axially extending inlet passage 108 in the rotor 26 aligns with a side port 112 in the sleeve liner and spark plug assembly 42 providing communication to the precombustion chamber 84.

In operation, rotor 26 planetates relative to crankshaft 28 while rotating within trochoidal cavity 20. As it does so, it sequentially and periodically positions each of the three precombustion chambers 84, in the case of a triangularly shaped rotor 26, in alignment with the side inlet port 86 in the front housing end wall, not shown. The chambers 84 are filled with a rich air-fuel mixture from an auxiliary carburetor. The respective annular seals 46 maintain their engagement with the adjacent housing end walls retaining the rich mixture within the precombustion chambers 84 as the rotor 26 continues rotation. The peripheral surface 22 of the trochoidal chamber in conjunction with each of the rotor peripheral surfaces 100 begin to define a chamber of reduced volume as the rotor peripheral surface 100 approaches top dead center at the minor axis of the trochoidal chamber. This movement starts compression of a lean main air-fuel mixture supplied to the chamber 102 which reaches a fully compressed condition when the respective peripheral rotor surface 100 is in the vicinity of a position substantially normal to the minor axis of trochoidal chamber 20. As was previously described the main air-fuel mixture is supplied through the side mounted inlet port 16 in rear end housing wall 14. As the main charge becomes fully compressed a portion of the lean air-fuel mixture is forced through throat passages 70 or the throat passage defined by orifices 106 in gland nut 104 whereby the rich mixture in the precombustion chambers 84 is slightly diluted, placing this mixture in a more combustible condition. As the rotor peripheral surface 100 reduces the main combustion chamber 102 to a minimum volume in the vicinity of top dead center, the spark plug 50 receives a timed pulse from the ignition circuit igniting the relatively rich charge in the precombustion chamber 84 and the burning gases expand through port 68 and throat passage 70 igniting the main charge in chamber 102. In the modified form of my invention, the burning gases expand through aperture 106 in gland nut 104, likewise igniting the lean air-fuel mixture in the main combustion chamber 102. In this manner a longer burning time at a lower temperature results which is effective to substantially reduce undesirable exhaust gas emissions as is well known in the stratified engine art.

The ignition of the rich mixture in the precombustion chambers 84 creates a substantial pressure increase on the front side wall 40 of rotor 26. To compensate for this change in pressure, the passages 90 in the rotor 26 provide for the transmission of the high pressure gases through passages 92 to the balancing cavities 94 on the rear side 96 of rotor 26. This balancing pressure received in cavities 94 is retained by seals 46 in the annular grooves 44 surrounding the cavities. The balancing cavities 94 have an area equal to the precombustion chambers 84 so that the rotor is axially balanced for thrust during the burning of the rich mixture in the precombustion chambers 84.

By the provision of a removable precombustion chamber and spark plug assembly 42 such as that provided by the liner 48 containing spark plug assembly 50, removal and insertion of the assembly 42 can readily be accomplished through an access port specifically located in the engine housing. Such an access port 114 is shown in phantom in FIG. 1 and is preferably located in a low pressure area of the engine. As illustrated in FIG. 1, the port is located near exhaust port 24 in a front housing end wall not shown. When the access port 114 is positioned as shown, it is only necessary to align the precombustion cavities 38 therewith and remove a threaded plug in the housing to gain access to the gland nut 88 retaining the precombustion chamber and spark plug assembly 42.

The side inlet port 86 supplying the rich air-fuel mixture to the precombustion cavities 84 is also located in a low pressure area of the engine and must necessarily be located between the gas and oil seals in the side face of the rotor. This is necessary so that high pressure gases do not enter the inlet 86 and prevent carburetion of the relatively rich mixture into the precombustion chambers. More specifically, it is required that the side inlet port 86 receive and be in communication with the same vacuum that the main inlet port 16 senses in order for a carbureted fuel mixture to enter the precombustion chambers 84.

While I have shown and described a particular embodiment of my invention it will, of course, be understood that various modifications and alternative constructions thereof may be made without departing from the true spirit and scope of my invention and that I intend by the appended claims to cover all such modifications and alternative constructions as fall within the true spirit and scope of my invention.

I claim:

1. A combination spark plug and precombustion chamber for a stratified charge rotary engine comprising in combination an engine housing including opposed end walls in conjunction with a central peripheral wall defining a rotor cavity, a rotor, an output shaft, an eccentric on said output shaft, said rotor planetating on said eccentric as it rotates within said cavity compressing a main relatively lean air fuel mixture supplied to the main combustion chamber on the peripheral wall of the said rotor, at least one precombustion chamber cavity formed in said rotor, an electrical contact secured to said rotor in said cavity, an engine ignition circuit, electrical circuit means connecting said contact with said ignition circuit, a liner defining a precombustion chamber, a spark plug secured in said liner forming a precombustion chamber and spark plug assembly, said assembly being positioned within said precombustion cavity in said rotor and being open to a peripheral surface of said rotor, an electrical contact on said spark plug engaging said rotor contact, said rotary engine housing having a passage sequentially and periodically supplying a rich air fuel mixture to said precombustion chamber as its opening rotates past said housing passage, and a throat passage connecting said precombustion chamber with said main combustion chamber whereby said precombustion chamber receives the rich air fuel mixture that is sequentially and periodically ignited by said ignition circuit so that the burning mixture expands through said throat passage igniting the charge in the main combustion chamber.

2. A combination spark plug and precombustion chamber for a stratified charge rotary internal combustion engine comprising in combination an engine housing including opposed end walls in conjunction with a central peripheral wall defining a multi-lobed cavity, a multi-apex rotor, an output shaft, an eccentric on said output shaft, said rotor planetating on said eccentric as it rotates within said cavity compressing a main relatively lean air fuel mixture for combustion therein, said rotor having opposite side walls each facing an adjacent one of said housing end walls, a precombustion cavity formed in one of said rotor side walls opening toward said adjacent housing end wall and being located adjacent each apex of said rotor, means supplying a relatively rich air fuel mixture to a supply inlet port strategically positioned in said adjacent housing end wall so that said precombustion cavity opening passes over said inlet port as said rotor planetates, an electrical contact secured to said rotor in each of said cavities, an ignition circuit, electrical circuit means connecting said contacts with said ignition circuit, a liner defining a precombustion chamber, a spark plug secured in said liner forming a precombustion chamber and spark plug assembly, said assembly being positioned within said precombustion cavities in said rotor, an electrical contact on said spark plugs engaging said rotor contacts, an auxiliary carburetor sequentially and periodically supplying a rich air fuel mixture to said strategically positioned inlet port in said adjacent housing end wall, said precombustion chambers being sequentially and periodically opened to said inlet port whereby the rich air fuel mixture is supplied therein, and a throat passage connecting said precombustion chambers with said main combustion chamber whereby ignition of the relatively rich air fuel mixture in said precombustion chambers results in expansion of the burning mixture through said throat passage igniting the charge in the main combustion chamber.

3. A combination spark plug and precombustion chamber for a stratified charge rotary internal combustion engine comprising in combination an engine housing including opposed end walls in conjunction with a central peripheral wall defining a trochoidal cavity, a triangular rotor, an output shaft, an eccentric on said output shaft, said rotor planetating on said eccentric as it rotates within said cavity defining work chambers of varying volume which move with the rotor as it planetates compressing a main relatively lean air fuel mixture supplied from a main carburetor for combustion therein, said rotor having opposite side walls each facing an adjacent one of said housing end walls, a precombustion cavity formed in one of said rotor side walls opening toward an adjacent housing end wall, an electrical contact secured to said rotor in said cavity, an ignition circuit, electrical circuit means connecting said contact with said ignition circuit, a liner defining a precombustion chamber of predetermined volume, a spark plug secured in said liner forming a precombustion chamber and spark plug assembly, an electrical contact on said spark plug engaging said rotor contact, a ceramic insulating flange molded integral with said spark plug and extending axially thereof having a tapered surface engaging a mating surface in an annular groove formed in said rotor adjacent said rotor mounted contact when said assembly is positioned within said precombustion cavity, an auxiliary carburetor, said housing end wall adjacent said one of said rotor side walls containing the precombustion cavities having a strategically positioned inlet port therein so that said precombustion cavities pass over said inlet port as said rotor planetates, said auxiliary carburetor supplying a rich air fuel mixture to said inlet port, said precombustion chambers being sequentially and periodically moved into communication with said inlet port receiving a rich air fuel mixture therein, a throat passage in said rotor connecting said precombustion chambers with a peripheral surface of said rotor defining corresponding main combustion chambers, and ignition means sequentially and periodically operable to ignite the rich air fuel mixture in said precombustion chambers whereby the burning gases expand through the corresponding throat passage igniting the main air fuel mixture in the corresponding main combustion chamber.

4. A combination spark plug and precombustion chamber for a stratified charge rotary internal combustion engine comprising in combination an engine housing including opposed end walls in conjunction with a central peripheral wall defining a rotor cavity, a rotor having peripheral surfaces, an output shaft, an eccentric on said output shaft, said rotor planetating on said eccentric as it rotates within said cavity compressing a main relatively lean air fuel mixture for combustion therein on respective peripheral surfaces of said rotor as it planetates within said rotor cavity, a precombustion chamber cavity formed in each peripheral surface of said rotor effective to compress the main charge within said rotor cavity, a liner defining a precombustion chamber, a spark plug secured in said liner forming a precombustion chamber and spark plug assembly, an electrical contact on the bottom side of said spark plug, said assembly being positioned within said precombustion cavity in said rotor, an electrical contact in the bottom of said precombustion cavity engaging the contact on said spark plug, an ignition circuit, electrical circuit means connecting said contact in said rotor with said ignition circuit, a fuel air mixture passage in said rotor connecting with said precombustion chamber, a threaded plug enclosing said precombustion chamber and defining an ignition throat passage therin, means sequentially and periodically supplying a rich air fuel mixture to said mixture passage thereby filling said precombustion chamber as said rotor planetates in said cavity, and ignition means igniting the rich mixture in the precombustion chambers whereby the burning gases expand through the throat passage in said threaded plug igniting the charge in the main combustion chamber.

* * * * *